Jan. 5, 1960 G. H. DAIGLE 2,919,885
BUTTERFLY VALVE
Filed Nov. 17, 1958 3 Sheets-Sheet 1

INVENTOR.
GEORGE H. DAIGLE
BY
ATTORNEYS

Jan. 5, 1960 G. H. DAIGLE 2,919,885
BUTTERFLY VALVE
Filed Nov. 17, 1958 3 Sheets-Sheet 2
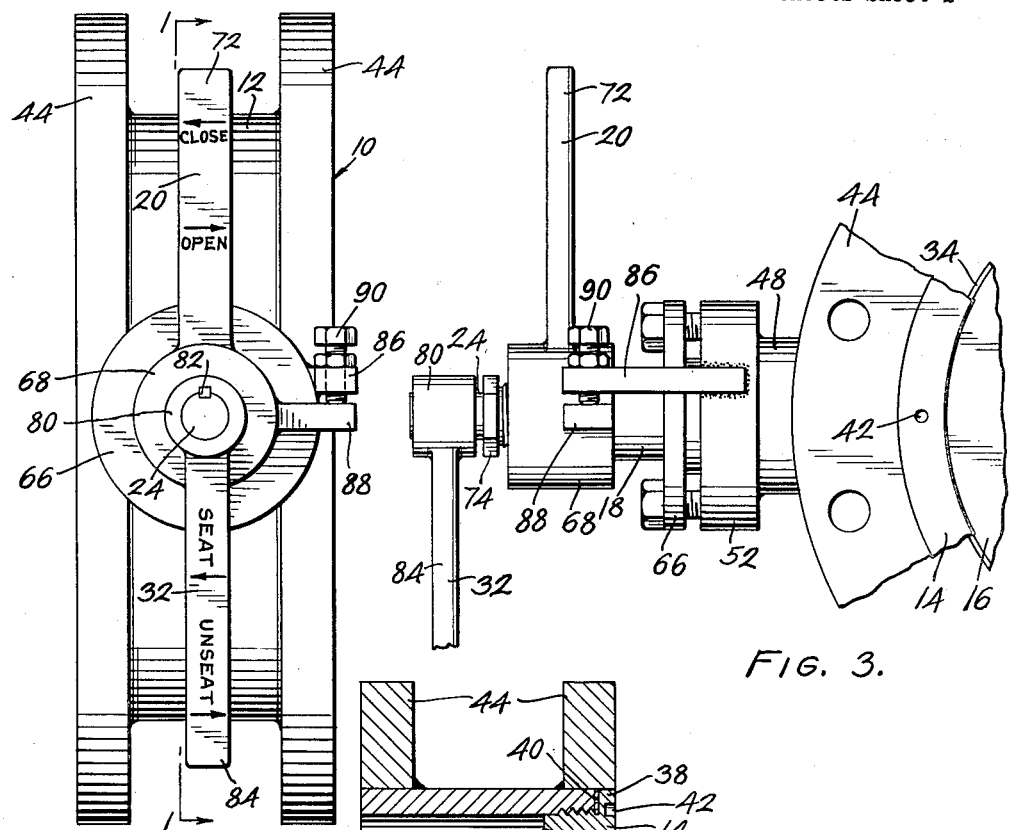
FIG. 2.
FIG. 3.
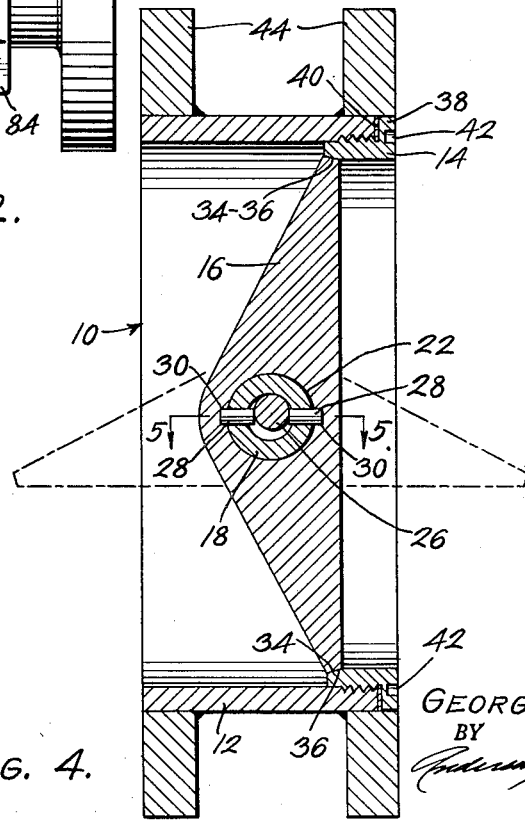
FIG. 4.
INVENTOR.
GEORGE H. DAIGLE
BY
ATTORNEYS Jan. 5, 1960

G. H. DAIGLE 2,919,885

BUTTERFLY VALVE

Filed Nov. 17, 1958

INVENTOR.
GEORGE H. DAIGLE
BY
ATTORNEYS

United States Patent Office 2,919,885
Patented Jan. 5, 1960

2,919,885

BUTTERFLY VALVE

George H. Daigle, Littleton, Colo., assignor, by mesne assignments, to Missile Valve Corp., Inc., Beverly Hills, Calif., a corporation of California Application November 17, 1958, Serial No. 774,458

12 Claims. (Cl. 251—161)

This invention relates to butterfly valves and, more specifically, to a butterfly valve of an improved design which includes novel means operative upon actuation to seat and unseat same.

Butterfly valves comprise one of the most popular and widely used mechanisms for controlling fluid flow. They are generally much less expensive than other types of valves and their design is such that little resistance is offered to the fluids flowing therethrough. Other advantages are their compactness, simplicity, ruggedness and ease of operation. Unfortunately, however, they are also characterized by several limitations which render them unsuitable for use under certain operating conditions.

Most critical of these deficiencies is, perhaps, the tendency of a butterfly valve to leak when subjected to the action of fluids under high pressure. This same problem also oftentimes arises when butterfly valves are used under either high or widely variant temperature conditions. This leakage can, of course, be attributed to the failure of the valve element or blade to seal properly against the seat. Overcoming this deficiency in a butterfly valve, however, becomes more difficult than one would first imagine.

It has been recognized for some time, especially in connection with other types of valve mechanisms than the butterfly valves, that the principle of mating frusto-conical surfaces on a valve element and the seat therefor provides one of the most effective fluid-tight seals operative under both extreme pressure and temperature conditions. In general, this arrangement utilizes the fluid pressure against the valve element to maintain the seal and is, therefore, relatively unaffected by high pressures. On the other hand, expansion and contraction of the valve element and seat under the influence of high temperatures or a range thereof, changes only the total area encompassed by the seal and not its overall effectiveness.

Ordinarily, mounting the valve element or blade of a butterfly valve within the valve body for movement between open and closed positions presents little or no difficulty as it is merely attached to a diametrical shaft which is rotatable from the outside thereof. When opposed frusto-conical mating surfaces between the blade and seat are used in a butterfly valve because of their excellent sealing qualities, however, means must be provided for unseating the blade before it can be opened. Similarly, this same means must be operative to seat the blade after it has been turned from open to closed position.

It is, therefore, the principal object of the present invention to provide an improved butterfly valve which includes novel means for seating and unseating the blade.

A second objective is the provision of a valve of the butterfly type in which a fluid-tight seal is maintained by means of opposed frusto-conical mating surfaces formed on the blade and seat.

Another object of the invention is the provision of a butterfly valve in which the valve element or blade is mounted on a diametrical shaft for movement relative thereto between seated and unseated positions.

Still another objective of the instant invention is to provide a valve of the type described wherein a cam shaft is journalled for relative rotational movement within a rotatable diametrical shaft carrying the blade, said cam shaft is operative upon actuation to shift the blade relative to the diametrical shaft to seat and unseat same.

Further objects of the present invention are to provide a butterfly valve which is adapted for use under high fluid pressures, one that functions well at elevated temperatures, and a valve of the type aforementioned which is operative over a wide range of temperatures and pressures.

Additional objects are to provide a butterfly valve that is simple to assembly and operate, one that is relatively inexpensive, a valve that is rugged and compact, and one that is extremely versatile.

Other objects will be in part apparent and in part pointed out specifically hereinafter in connection with the description of the drawings that follows, and in which:

Figure 2 is a side elevation thereof;

Figure 3 is a fragmentary end elevation showing the control handles for operating the blade;

Figure 4 is a diametrical section taken along line 4—4 of Figure 1;

Figure 1:
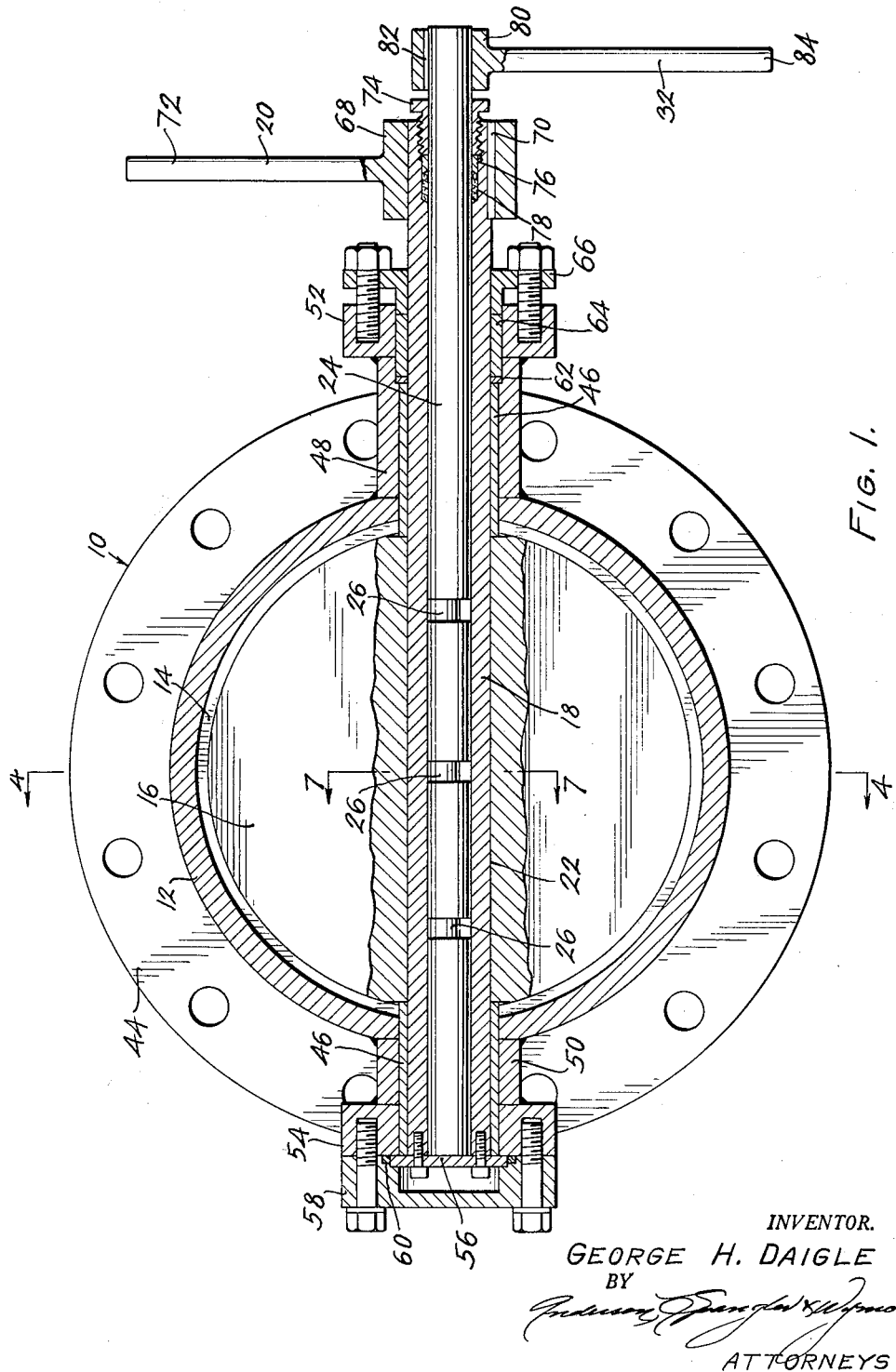
Figure 1 is a transverse section taken along line 1—1 of Figure 2 showing the butterfly valve of the present invention, portions thereof having been broken away to better expose the construction.

Referring now to the drawing, and in particular to Figures 1 through 4 thereof, it will be seen that the butterfly valve of the present invention which has been indicated in a general way by numeral 10, includes a tubular valve body 12 having a continuous ring seat 14 threadedly attached therein and located to cooperate with a tiltable valve element or blade 16 to form a fluid-tight seal. Blade 16 is keyed to a hollow diametrical shaft 18 which is mounted for rotational movement within the valve body and projects onto the exterior thereof in position to receive actuating means 20 used to move the blade between open and closed positions. The diametrical opening 22 through the blade is of a generally flattened or oblated cylindrical shape adapted to permit relative movement of the blade on the cylindrical diametrical shaft toward and away from the ring seat in a manner which will be set forth in detail presently. This movement of the blade in relation to the seat is accomplished by means of a cam shaft 24 mounted inside the hollow diametrical shaft for independent relative rotational movement. Shaft 24 is mounted coaxially inside shaft 18 but includes one or more cam sections 26 which cooperate with opposed pairs of pins 28 located within the keyways 30 of the blade to shift it relative to the hollow shaft. The cam shaft projects beyond the outer end of the diametrical shaft in position to receive the actuating means therefor which has been identified by numeral 32.

Figure 5:
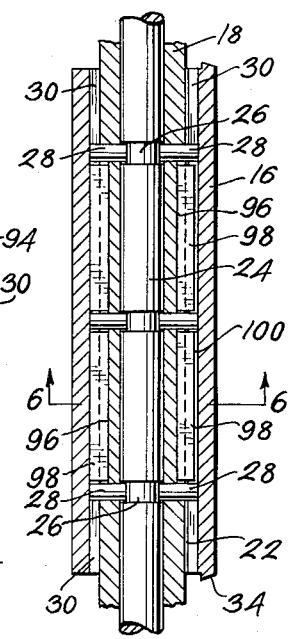
Figure 5 is a fragmentary section taken along line 5—5 of Figure 4 showing the cam and diametrical shafts to a slightly enlarged scale.

Figures 4 and 5 show the blade 16 as being circular and generally disk-shaped with a tapered frusto-conical sealing surface 34 formed around the peripheral edge thereof which is seen most clearly in Figure 3. The inside of ring seat 14 is formed to provide a mating frusto-conical sealing surface 36 arranged in opposed relation to surface 34 of the blade and adapted to cooperate therewith to produce a continuous annular fluid-tight joint therebetween. In the specific form shown, the ring seat is threaded on the exterior thereof so that it can be screwed into a corresponding threaded section located on the interior of the valve body. Also, the ring seat is preferably provided with an annular flange 38 adapted to close against the end of the valve body with a shim 40 positioned therebetween. Sockets 42 in flange 38 receive a suitable tool used to thread the seat into the valve body. Peripheral flanges 44 on opposite ends of the valve body, of course, provide the means by which the valve is connected between corresponding flanges on adjacent ends of a pipeline carrying the fluid, the flow of which is to be controlled.

In Figures 1, 2 and 3, it can be seen that the hollow shaft 18 extends through diametrically opposed openings in the valve body where it is journalled for rotation within bearings 46 retained in place by tubular shaft housings 48 and 50. These shaft housings have their inner ends welded or otherwise permanently attached to the outside of the valve body in concentric relation to the shaft openings therein while their outer ends are provided with annular flanges 52 and 54. A thrust bearing 56 is bolted or otherwise attached to one end of shaft 18 and is sized to overlie and engage the outer surface of flange 54 along with the bearing 46 associated therewith. Cap 58 covers the thrust bearing and is bolted to flange 54 which cooperates therewith to prevent axial movement of shaft 18, as shown. An O-ring seal 60 is located in an annular groove formed between the cap and flange 54 around the thrust bearing. Suitable shims (not shown) may be located, if necessary, between the thrust bearing and the adjacent sleeve bearing 46 to center the blade within the bore of the valve body. Packing seat 62 located at the outer end of sleeve bearing 46 and resting against the shoulder formed on the inside of hollow shaft 18, provides one abutment for shaft packing 64 which is retained in place by gland 66 bolted to flange 52, as shown in Figure 1. In the particular embodiment of the valve illustrated herein, the means 20 for actuating or turning the hollow shaft comprises merely a sleeve 68 attached to the shaft with a key 70 and having an operating handle 72 projecting therefrom. Of course, other actuating means 20 for rotating the hollow shaft to move the blade between open and closed positions could be substituted for manually-operated handle 72, if desired.

Cam shaft 24 is journalled within the bore of shaft 18 for independent rotational movement relative thereto and with one end in abutting relation to thrust bearing 56. The other end of the cam shaft turns within a stuffing box located in an enlarged section of the axial bore in hollow shaft 18. This stuffing box includes a gland 74 threadedly attached within the enlarged section of the bore in the hollow shaft for axial movement against a packing ring 76 that functions to compress stuffing 78. The actuating means 32 for turning the camshaft comprises a sleeve 80 attached to the projecting end thereof by key 82 and having a handle element 84 extending therefrom. Here again, other means 32 for turning the camshaft could easily be substituted for the hand-operated handle 84.

Figure 7:
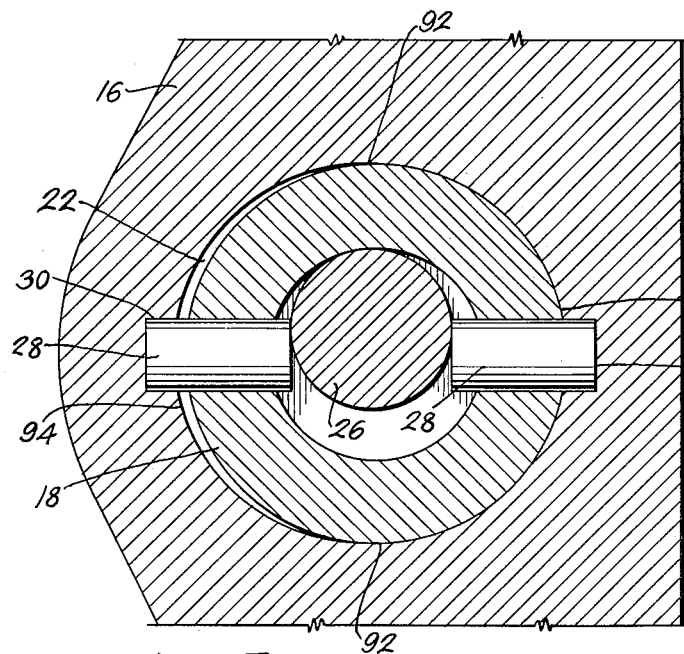
Figure 7 is a further enlarged fragmentary section taken along line 7—7 of Figure 1 showing the position of the shafts to place the blade in sealed position against the seat; and, Figure 8 is a fragmentary section similar to Figure 7 showing the shafts positioned to unseat the blade.
Figure 8:
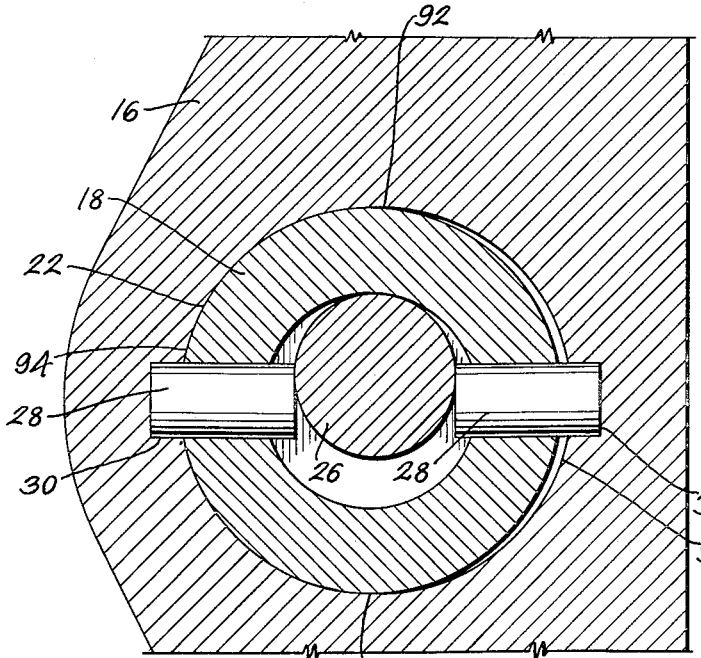

Figures 2 and 3 also show the valve provided with adjustable stop means operative to locate the blade in correct alignment for movement between its seated-closed and unseated-closed positions shown in Figures 7 and 8. This stop means comprises a pair of opposed abutments 86 and 88 depending from a stationary element of the valve body, such as flange 52, and a rotatable element of the hollow shaft assembly, such as sleeve 68. One of these abutments 86 or 88 carries an adjustable element 90 movable into contact with the other of said abutments upon relative rotational movement therebetween to define the closed position of the blade. Obviously, the degree to which the hollow shaft and associated blade are rotated when moved from open to closed position determines the tilt of the blade relative to the bore axis of the valve body. Such a relationship is critical as the opposed frusto-conical surfaces of the blade and ring seat must be positioned to mate and form a fluid-tight seal when the cam shaft is turned to move the blade from its closed-unseated position to closed-seated position. Element 90, therefore, provides the means for adjusting the blade relative to the seat in order that a continuous annular fluid-tight joint therebetween can be achieved and maintained.

Now, with reference to the remaining figures of the drawing, specifically Figures 5-8, inclusive, it will be seen that the diametrical opening 22 through the blade is of a generally flattened or oblate cylindrical shape which provides a major and a minor transverse axis. The minor transverse axis of opening 22 extends between the narrow but flattened surfaces 92 thereof which are located in opposed diametrical relation to the blade and spaced apart approximately the outside diameter of hollow shaft 18. The major transverse axis of opening 22, on the other hand, extends between the opposed semi-cylindrical surfaces 94 which lie adjacent the top and bottom of the blade and is of a length slightly greater than the outside diameter of hollow shaft 18. Therefore, the size and shape of diametrical opening 22 is such that the blade is free to shift slightly in the direction of its thickness relative to hollow shaft 18 but not from side to side. Thus, with the blade in the closed position of Figures 7 and 8, it is free to shift along the bore axis of the valve body between the closed but unseated position of Figure 7 and the closed and seated position of Figures 4, 6 and 8. This axial shift of the blade when closed toward and away from the valve seat 14 is necessary in order to permit rotational movement of the blade between the closed position shown in full lines in Figures 4, 6, 7 and 8, and the open position indicated by dotted lines in Figure 4.

Figure 6:
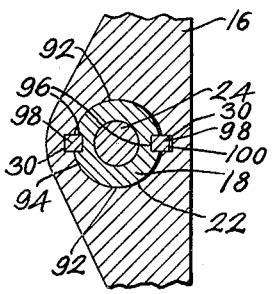
Figure 6 is a fragmentary section similar to Figure 4 taken along line 6—6 of Figure 5.

An examination of Figures 5 and 6 will also show that the semi-cylindrical surfaces 94 of the diametrical opening 22 are each provided with longitudinal keyways 30 arranged in opposed relation and the cylindrical outside surface of hollow shaft 18 is likewise formed to include cooperating keyways 96. Adjacent aligned keyways 30 and 96 receive keys 98 which lock the blade to the hollow shaft for conjoint rotational movement. Note, however, that the depth of the keyways 30 and 96 in relation to the thickness of keys 98 is such that a gap 100 exists therebetween of a size to permit relative movement of the blade on the hollow shaft toward and away from the valve seat as aforementioned.

The opposed pairs of pins 28 are located within longitudinally spaced openings in the base of keyway 96 in the hollow shaft which opens onto the eccentric cylindrical cam sections 26 of the camshaft 24. The inner ends of the pins 28 are spaced apart the diameter of the cylindrically-shaped eccentric cam sections 26 while the outer ends thereof are bottomed within the blade keyways 30. The inner ends of these pins, therefore, ride on the cylindrical surfaces of the eccentric cam sections 26 and cooperate therewith upon rotation of the camshaft to shift the blade between the unseated closed position of Figure 7 and the seated closed position of Figure 8. Thus, clockwise rotation of the camshaft as viewed in Figure 2 is operative to shift the blade from the closed but unseated position of Figure 7 into the closed and seated position of Figures 4, 6 and 8. Conversely, counter clockwise rotation of the camshaft operates to shift the blade from the seated and closed position of Figures 4, 6 and 8 into the unseated closed position of Figure 7 where it is free to be rotated into open position by clockwise rotation of the hollow shaft.

Having thus set forth the several useful and novel features of the butterfly valve of the present invention, it will be seen that the many worthwhile objectives for which it was designed have been achieved. Although but a single specific form of the invention has been illustrated and described in connection with the accompanying drawings, I realize that certain changes and modifications therein may occur to those skilled in the art within the broad teaching hereof; hence, it is my intention that the scope of protection afforded hereby shall be limited only insofar as said limitations are expressly set forth in the appended claims.

What is claimed is:

1. A butterfly valve comprising a tubular body, a ring seat having a continuous frusto-conical sealing surface formed around the inside thereof attached within the body, a hollow shaft extending diametrically through the body and journalled for rotation therein in spaced substantially parallel relation to the frusto-conical sealing surface of the seat, a camshaft having at least one eccentric cam section formed thereon journalled for relative rotational movement within the hollow shaft, a disk-like blade having a diametrical opening therethrough and a frusto-conical sealing surface around the periphery thereof mounted on the hollow shaft for tiltable movement therewith between an open position substantially normal to the seat and a closed position parallel thereto, said diametrical opening being shaped to receive the hollow shaft and permit movement of the blade in closed position relative thereto between an unseated position wherein the frusto-conical sealing surfaces lie in opposed spaced relation and a seated position in which said sealing surfaces are in continuous annular fluid-tight sealed contact with one another, and pin means connecting the blade with an eccentric section of the camshaft operative upon rotational movement thereof relative to the hollow shaft to shift said blade between seated and unseated positions when closed.

2. The valve as set forth in claim 1 in which the hollow shaft is cylindrical and the diametrical opening through the blade is of an oblated cylindrical shape having a minor transverse axis extending in the direction of the width of said blade of a length substantially equal to the outside diameter of the hollow shaft and a major axis extending in the direction of the thickness of said blade which is longer than the outside diameter of said hollow shaft.

3. The valve as set forth in claim 1 in which the ring seat is threadedly connected within the tubular body for axially adjustable movement relative to the blade.

4. The valve as set forth in claim 1 in which the eccentric sections of the camshaft are cylindrical.

5. The valve as set forth in claim 1 in which the pin means comprises a pair of pins mounted in the wall of the hollow shaft for reciprocal movement in opposed relation substantially normal to the axis of said hollow shaft, the adjacent ends of said pins being in slidable contact with the eccentric section of the camshaft while the opposite ends thereof bear against opposed surfaces of the diametrical opening in the blade.

6. The valve as set forth in claim 1 in which a fixed abutment depends from the body and a movable abutment depends from the body and a movable abutment depends from the hollow shaft in position to contact one another upon relative rotational movement therebetween forming a stop operative to locate the valve in closed position.

7. The valve as set forth in claim 1 in which a first actuating means is operatively connected to the hollow shaft for rotating same to move the blade between open and closed positions.

8. The valve as set forth in claim 1 in which a second actuating means is operatively connected to the camshaft for rotating same to shift the closed blade between seated and unseated positions.

9. The valve as set forth in claim 1 in which cooperating keys and keyways operatively interconnect the blade and hollow shaft for conjoint rotational movement between open and closed positions.

10. The valve as set forth in claim 2 in which the pin means comprises a pair of pins mounted in the wall of the hollow shaft for reciprocal movement in colinear relation substantially normal to the axis of said hollow shaft, the adjacent ends of said pins being in slidable contact with the eccentric section of the camshaft while the opposite ends thereof bear against the opposed semi-cylindrical surfaces of the oblated cylindrical opening through the blade.

11. The valve as set forth in claim 2 in which at least one of the semi-cylindrical surfaces of the oblated cylindrical surfaces of the oblated cylindrical opening through the blade and the adjacent cylindrical surfaces of the hollow shaft are each provided with longitudinally aligned keyways, and a key of a thickness not greater than the combined depth of said aligned keyways is mounted therein operatively interconnecting the blade and hollow shaft for conjoint rotational movement.

12. The valve as set forth in claim 6 in which adjustable means is carried by one of said fixed and movable abutments, said means being operative to vary the relative rotational positions between said abutments at the point of contact therebetween.

No references cited.